Patented Oct. 14, 1947

2,429,098

UNITED STATES PATENT OFFICE 2,429,098

1-PHENYL-2-PIPERONYLIDENE-HYDRAZINE AS A FUNGICIDE

Elbert C. Ladd, Passaic, N. J., assignor to United States Rubber Company, New York, N. Y., a corporation of New Jersey No Drawing. Application February 9, 1945, Serial No. 577,132

10 Claims. (Cl. 167—33)

This invention relates to new and useful improvements in 1-phenyl-2-piperonylidene-hydrazine as a fungicide. The invention further relates to methods of treating plants, and to methods of protecting organic material subject to attack by fungi, as the immunizing of seed, and the mildewproofing of fabrics and other material.

I have found that 1-phenyl-2-piperonylidene-hydrazine is an effective fungicide. The chemical and a method of preparation are described by Rudolph, Beilstein, 4th ed., 19, 123.

The compound may be used as a seed protectant, and to protect plants, which term includes plant parts, or soil from microorganisms harmful to seeds and plants. It may also be applied to prevent or retard fungus growth and the formation of, for example, mildew on organic material such as rope, wood, fur, hair, feathers, cotton, wool, leather, paints, varnishes and the like. It may be applied as a dust, undiluted or mixed with a powdered solid carrier, such as clay or talc, or as a liquid or a spray in a liquid carrier, as in solution in a suitable solvent, or suspended in a suitable non-solvent, for example, water. Preferably when applied from suspension in a liquid carrier, the composition contains a dispersing agent for the chemical. It may be applied as to foliage by the aerosol method. Solutions for the aerosol treatment may be prepared by dissolving the chemical directly in the highly volatile liquid carrier or first dissolving the chemical in a less volatile solvent and then admixing such solution with the highly volatile liquid aerosol carrier. The compound may be used admixed with carriers that are active of themselves, for example, other fungicides, or bactericides, insecticides, insectifuges, fertilizers, hormones, buffering or softening agents.

The following examples are given to illustrate the invention:

Example I

Pea seed (variety Perfection) were tumbled with 1% by weight and with .125% by weight of 1-phenyl-2-piperonylidene-hydrazine in dust form. The seeds were then planted in greenhouse soil known to be infected with a number of organisms including *Pythium ultimum*. An equivalent number of untreated seeds were planted under similar conditions. Observations made at the end of ten days showed that 81% of the seed treated with 1% by weight of the chemical had germinated, whereas only 10% of the untreated seed had germinated. Observations made at the end of ten days on the seed treated with .125% by weight of the chemical showed that 55% of the treated seed had germinated whereas only 19% of the untreated seed had germinated.

Example II

In slide tests made on spores of the fungus *Sclerotinia fructicola* using the slide technique described by S. E. A. McCallan, et al., Contributions Boyce Thompson Institute 4, 223 (1932); 9, 249, (1938); 10, 320, (1939); 12, 49, (1941); 12, 431 (1942), at a concentration of 500 parts of 1-phenyl-2-piperonylidene-hydrazine per million parts of water, none of the treated spores germinated. At a concentration of 50 parts per million of the chemical in water only 8% of the spores germinated. Germination of untreated spores was 98%.

Example III

A piece of cotton fabric was immersed in a 1% solution (by weight) of 1-phenyl-2-piperonylidene-hydrazine in acetone until the material was completely impregnated with the solution. Thereafter it was removed from the solution and air dried to completely remove the acetone. The piece was then inoculated with *Chaetomium globosum* spore suspension and incubated for 32 days. A piece of cotton fabric treated with acetone only and dried (check) was inoculated with *Chaetomium globosum* spore suspension and incubated at the same time. At the end of the incubation period, it was observed that the material treated with 1-phenyl-2-piperonylidene-hydrazine was free of fungus growth, whereas the untreated check piece was heavily overgrown with fungus.

Having thus described my invention, what I claim and desire to protect by Letters Patent is:

1. A fungicidal composition comprising as an active ingredient 1-phenyl-2-piperonylidene-hydrazine and a carrier therefor selected from the group consisting of clay and talc, and water containing a dispersing agent.

2. A fungicidal composition comprising a powdered solid carrier and as an active ingredient 1-phenyl-2-piperonylidene-hydrazine.

3. A fungicidal composition comprising an aqueous suspension of 1-phenyl-2-piperonylidene-hydrazine, said aqueous suspension containing a dispersing agent.

4. The method of protecting organic material susceptible to attack by microorganisms which comprises treating said organic material with 1-phenyl-2-piperonylidene-hydrazine.

5. The method of controlling fungi on plants which comprises treating plants with 1-phenyl-2-piperonlyidene-hydrazine.

6. The method of protecting seeds, plants and soil subject to attack or infestation by fungi which comprises treating said material with 1-phenyl-2-piperonylidene-hydrazine.

7. The method of immunizing seed which comprises treating said seed with 1-phenyl-2-piperonylidene-hydrazine.

8. The method of controlling fungi on living organisms which comprises treating said organisms with 1-phenyl-2-piperonylidene-hydrazine.

9. The method of destroying fungus which comprises subjecting said fungus to the action of 1-phenyl-2-piperonylidene-hydrazine.

10. The method of controlling mildew on organic material which comprises treating said organic material with 1-phenyl-2-piperonylidene-hydrazine.

ELBERT C. LADD.

REFERENCES CITED

The following references are of record in the file of this patent:

UNITED STATES PATENTS

| Number | Name | Date |
|---|---|---|
| 2,326,350 | Gertler et al. | Aug. 10, 1943 |
| 2,362,128 | Gertler et al. | Nov. 7, 1944 |
| 2,362,350 | Gertler et al. | Nov. 7, 1944 |

OTHER REFERENCES

Beilstein, vol. 19, 4th edition, page 123.